US010695967B2

(12) United States Patent
Holm et al.

(10) Patent No.: US 10,695,967 B2
(45) Date of Patent: Jun. 30, 2020

(54) MOULDING ASSEMBLY

(71) Applicant: Tetra Laval Holdings & Finance S.A., Pully (CH)

(72) Inventors: Henrik Holm, Veberöd (SE); Klas Sjöberg, Lund (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 51 days.

(21) Appl. No.: 15/772,480

(22) PCT Filed: Oct. 25, 2016

(86) PCT No.: PCT/EP2016/075707
§ 371 (c)(1),
(2) Date: Apr. 30, 2018

(87) PCT Pub. No.: WO2017/076703
PCT Pub. Date: May 11, 2017

(65) Prior Publication Data
US 2018/0319065 A1    Nov. 8, 2018

(30) Foreign Application Priority Data
Nov. 2, 2015   (SE) .................................... 1551413

(51) Int. Cl.
*B29C 45/77*   (2006.01)
*B29C 45/50*   (2006.01)
(Continued)

(52) U.S. Cl.
CPC .............. *B29C 45/77* (2013.01); *B29C 45/03* (2013.01); *B29C 45/5008* (2013.01);
(Continued)

(58) Field of Classification Search
CPC . B29C 2045/548; B29C 48/301; B29C 45/50; B29C 45/54; B29C 2045/5032;
(Continued)

(56) References Cited

U.S. PATENT DOCUMENTS 3,723,037 A * 3/1973 Formo ................... B29C 45/40
                                                425/139
4,078,454 A * 3/1978 Murakami ............ B30B 11/241
                                                100/145
(Continued)

FOREIGN PATENT DOCUMENTS

DE    10 2007 049689 A1    4/2009
EP           1741538 A1    1/2007
(Continued)

OTHER PUBLICATIONS

International Search Report and Written Opinion for International Application No. PCT/EP2016/075707 dated Feb. 2, 2017 in 10 pages.
(Continued)

*Primary Examiner* — Anthony Calandra
*Assistant Examiner* — Elisa Vera
(74) *Attorney, Agent, or Firm* — Knobbe, Martens, Olson & Bear, LLP

(57) ABSTRACT

A moulding assembly with an inlet for receiving raw material to be ejected is disclosed. The moulding assembly may include: a barrel for gathering and processing the raw material received through the inlet, a screw for engaging the raw material in the barrel, and a first drive unit configured for rotating the screw in order to grind the raw material into liquid form. The moulding assembly may further comprise a second drive unit configured to displace the screw in a
(Continued)

direction essentially perpendicular to the rotation direction in and out of the barrel depending on the pressure in the barrel.

18 Claims, 5 Drawing Sheets

(51) Int. Cl.
*B29C 45/03* (2006.01)
*B29C 45/84* (2006.01)

(52) U.S. Cl.
CPC .............. *B29C 2045/5032* (2013.01); *B29C 2045/848* (2013.01); *B29C 2945/76006* (2013.01); *B29C 2945/7619* (2013.01)

(58) Field of Classification Search
CPC ... B29C 45/53; B29C 2045/547; B29C 45/32; B29C 45/07; B29C 45/06; B29C 2043/3466; B29C 43/08; B29C 2043/5084; B29C 2045/065; B29C 31/042; B29C 31/047; B29C 51/22; B29C 51/24; B29C 45/00; B29C 45/0046; B29C 45/77; B29C 45/5008; B29C 45/03; B29C 2045/848; B29C 2945/76006; B29C 2945/7619
USPC .......................... 425/145, 149; 264/211.21
See application file for complete search history.

(56) References Cited

U.S. PATENT DOCUMENTS

| | | | | |
|---|---|---|---|---|
| 5,002,717 | A * | 3/1991 | Taniguchi | B29C 45/50 264/328.1 |
| 5,217,725 | A * | 6/1993 | Inaba | B29C 45/5008 264/40.4 |
| 5,518,672 | A * | 5/1996 | Luker | B29C 48/254 264/40.1 |
| 6,109,910 | A * | 8/2000 | Sekido | B29C 45/50 425/561 |
| 6,247,913 | B1 * | 6/2001 | Shibuya | B29C 45/5008 425/145 |
| 2003/0108640 | A1 * | 6/2003 | Nishizawa | B29C 45/5008 425/587 |
| 2003/0127765 | A1 * | 7/2003 | Weiland | B29C 31/045 264/69 |
| 2009/0123587 | A1 * | 5/2009 | Martin | B29C 48/92 425/145 |
| 2015/0246472 | A1 * | 9/2015 | Dirneder | B29C 45/5008 425/149 |

FOREIGN PATENT DOCUMENTS

| | | |
|---|---|---|
| EP | 1095753 A1 | 5/2011 |
| JP | 2004-058571 A | 2/2004 |
| JP | 2013-018283 A | 1/2013 |

OTHER PUBLICATIONS

Office Action received in Swedish Application No. 1551413-6 dated May 24, 2016.

* cited by examiner

MOULDING ASSEMBLY

TECHNICAL FIELD

The present invention is related to the field of moulding of containers. More specifically, it relates to a moulding assembly for moulding containers and a method for moulding containers.

BACKGROUND

Injection and extrusion moulding are two well-known technologies for manufacturing items from polymer, glass, ceramic or even metal and have been known and studied for decades.

In injection moulding, raw material in the form of granules is fed into a granulate inlet and from there to a barrel where it is transformed into a liquid melt under the influence of heat and mechanical forces. Usually, the mechanical force on the granules is exerted by a screw which is rotatable inside and movable within the barrel. Once a certain mass of molten granules has gathered in the barrel, the screw is retracted from the barrel, due the increasing volume of molten mass. In the next step, the screw is pushed back into its original position pushing the mass of raw molten material out of the barrel under pressure. In order to release the pressurized molten raw material into the mould, an injection needle closing the access to an injection mould is opened and the pressurized molten raw material is released into the mould. Usually, more than one injection needle is present, such that the molten mass may enter the mould from several locations. Usually, several moulds are present in such an injection moulding apparatus as well. After cooling down in the mould, the molten mass hardens into a solid material which then may be pushed or blown out of the mould, making space for injection moulding of yet another solid item. The entire process is then repeated.

Usually, any material that can be transformed into liquid phase may be used as raw material for injection moulding, such as metal, glass, ceramics and various types of polymers. Extrusion moulding has a lot in common with injection moulding, since in extrusion moulding a raw material is melted into liquid form by means of a rotation screw and heat. However, the main difference is that the molten raw material is continuously fed out of the barrel into the mould through a two-dimensional die. Another difference between the two methods is that in extrusion moulding the extruder screw is not retracted from the barrel before being released into the barrel Several problems arise when using injection or extrusion moulding continuously in an industrial process.

Firstly, traditional injection and extrusion moulding processes have an inherent inertia due to the movement of the extruding screw which needs time to speed up or slow down its movement. As a consequence, liquid pressure in such traditional systems cannot be controlled with the desired speed. This makes them less suitable for injection moulding methods where speed is essential.

Secondly, existing solutions are dependent on the presence of an accumulator as a raw material melt buffer. Traditional accumulators are at risk of leaking the liquid raw material and "burning" it. Moreover, problems may arise when raw material of one colour is to be exchanged for another material of a different colour. Here, a so called dead-end problem occurs, for example in the accumulator, meaning that remains of the old raw material, which for example may be white are mixed with the new raw material which may be black resulting in injection moulded objects that are greyish. This is, of course, undesirable in end products. Thus, there is a desire to provide an improved injection moulding method and apparatus which solves at least some of the problems associated with known technology.

SUMMARY

One aspect of the solution according to the present invention is a moulding assembly comprising:
  an inlet for receiving raw material to be ejected;
  a barrel for gathering and processing the raw material received through the inlet;
  a screw for engaging the raw material in the barrel;
  a first drive unit configured for rotating the screw in order to grind the raw material into liquid form
  characterized in that
  the moulding assembly further comprises a second drive unit configured to displace the screw in a direction essentially perpendicular to the rotation direction in an out of the barrel depending on the pressure in the barrel.

In this way, such a moulding assembly can react much quicker to pressure build-ups in the assembly in order to uphold a certain liquid pressure value in the barrel or also to change the pressure value by several means when there is a critical liquid pressure build-up in the barrel.

One of these means is by having a drive unit with an air inlet and an air outlet with a spring-loaded piston located between them, where controlling the air pressure difference between them may displace the piston. The piston, on the other hand, is connected to the (extruder) screw, such that the piston's movement urges the screw to move in the same direction. This movement may be either into or out of the barrel where the ground and liquid raw material is located thus increasing the liquid pressure in the barrel or decreasing it.

One main advantage of the moulding assembly of the existing solutions is that the injection moulding process can be sped up considerably, since the liquid pressure in the system can be controlled more quickly. This is achieved by the pressure regulated displacement and/or rotation of the extruder screw. Also, since no buffer chambers are present, no dead ends are bound to occur, i.e. raw material of one type and/or colour will not get stuck in the buffer chambers, but can be quickly ejected through the pressure regulation and pressure feedback means affecting the movement of the extruder screw and the injection needle.

One further advantage of the moulding assembly according to the present invention is that it can be easily made into a rotating moulding assembly adapted for use in a rotary filling machine for containers containing foodstuffs.

Another aspect of the solution according to the present invention is a method for moulding a product in a moulding assembly comprising:
  providing raw material through an inlet and into a barrel;
  rotating a screw in the barrel to grind the raw material into molten/liquid form
  measure liquid pressure of the raw material in the barrel;
  comparing the measured liquid pressure value in the barrel with a critical threshold pressure value and;
  adjusting the pressure in the barrel by moving the screw out of the barrel and/or adjusting the rotational speed of the screw in case the critical threshold pressure value has been reached.

The advantage of the above method is that in case the moulding assembly receives a stop signal, which may be due to problems at the outlet of a filling machine of which the moulding assembly is a part, any liquid pressure build-up in the barrel beyond the threshold value can be mitigated by either controlling the translational movement of the screw in the barrel and/or its rotational speed. Hence, the system will be safe under any circumstances and mostly ready to continue injection moulding as soon as the stop condition has been removed.

DETAILED DESCRIPTION

Before a detailed description of possible embodiments of the present invention is given below, it should be emphasized that these embodiments are only given for illustration purposes and not as limitations of the present inventions. A skilled person who has studied the description below would be able to develop other embodiments while still being within the scope of the accompanied claims. Thus ultimately, the present invention is only limited by the accompanying claims.

Figure 1A:
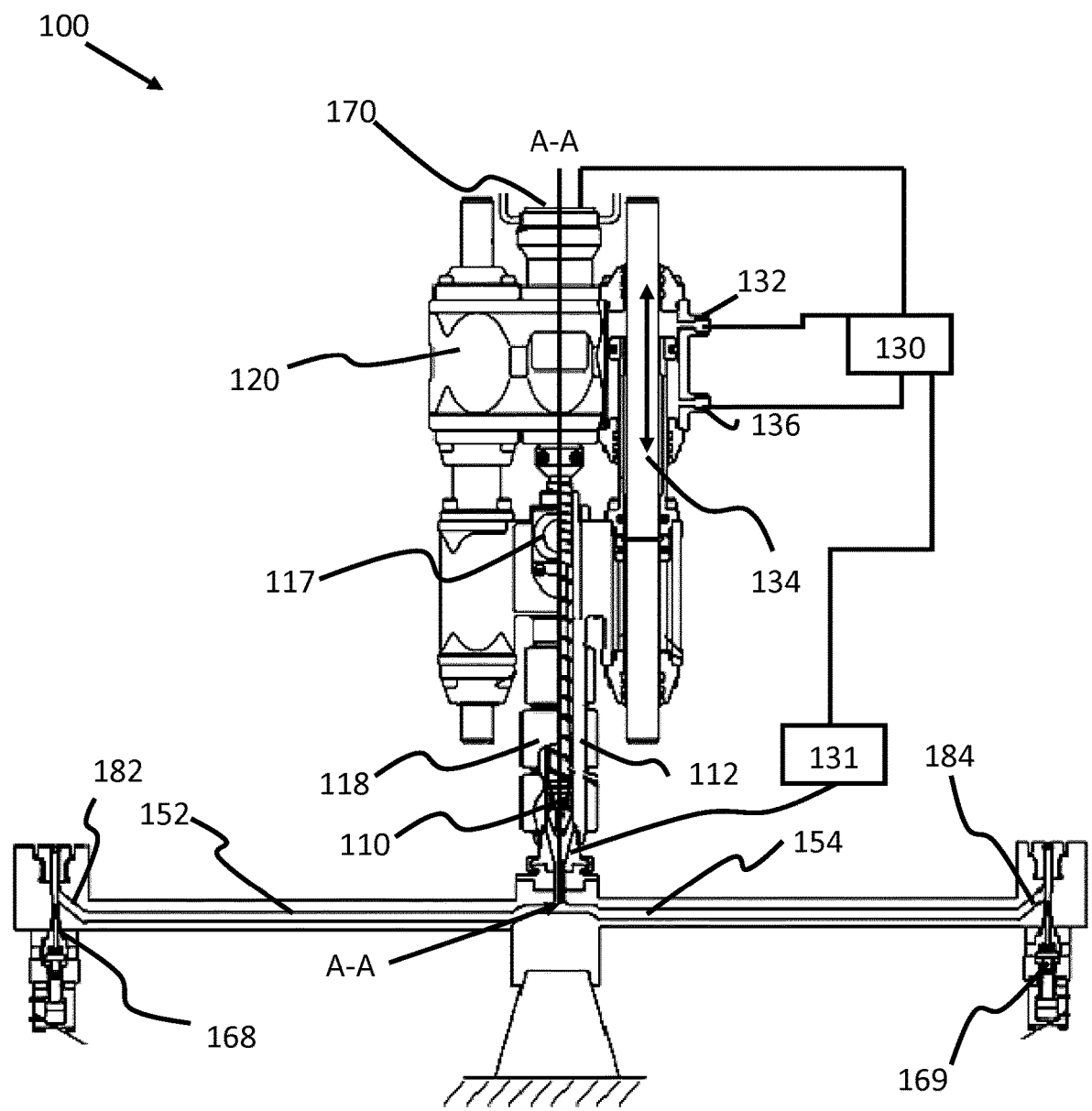
FIG. 1A illustrates one embodiment of the moulding assembly according to the present invention.

FIG. 1A illustrates one embodiment of the moulding assembly 100 according to the present invention.

Firstly, an extruder screw 110 is rotatably arranged in a barrel 112 where raw material, which in this embodiment is present in the form of plastic granules, is collected. The raw material is fed through a feeding inlet 117. As mentioned before in the background section of this application, the use of plastic granules is exemplary only. It may be any raw material which may be ground into liquid form in the presence of the mechanical forces stemming from the rotational movement of the extruder screw 110 and heat facilitating the transition from solid into liquid phase.

Return to the FIG. 1A, heating devices 118 are arranged around the barrel 112 which, together with the rotation of the extruder screw 110 grinding the raw material, aid in turning the raw material in the barrel 112 into a molten liquid mass. The rotational movement of the extruder screw 110 also creates pressure on the molten raw material flowing out from the barrel 112 and into one or more conduits 152, 154. The molten raw material is fed out from the barrel 112 into one or more conduits 152, 154 which are connected to the barrel 112 by a distributer hub 160 (shown in FIG. 1B) having a number of apertures corresponding to the number of conduits into which the pressurized liquid raw material is fed out.

In the embodiment in FIG. 1A, two conduits 152, 154 are shown, but the moulding assembly 100 may comprise a plurality of conduits each connected to a corresponding ejection outlet 182, 184. The ejection outlet is the place where the molten raw material is located before it is ejected into the mould. Ejection of the molten raw material is effected by means of an injection needle 168, 169 controlled by means of a programmable drive unit which instructs the injection needle to move and thus open or close the injection outlet for the molten raw material to flow into the mould. As the control of the injection needles 168, 169 shown in FIG. 1A is not the focus of this patent application, any detailed description of the programmable drive unit is omitted here. It should be mentioned here that the molten raw material in the moulding assembly 100 is pressurized and as such exists in the moulding assembly and enters the mould.

Now, the difference between a standard moulding assembly and the one according to the embodiment of the invention in FIG. 1A is that the extruder screw 110 not only is rotatably arranged in the barrel 112, but that it also partly arranged in an accumulator chamber 120. It should be noted here that the term accumulator chamber does not imply than any liquid or solid raw material is accumulated there. Any raw material fed through the inlet 117 will be present either in the barrel 110 or in the conduits 152, 154 including the ejection outlets 182, 184. Rather, the term accumulator chamber is used in the context of accumulating a potential liquid pressure build-up in the barrel 110 which will be discussed further down in the text. Now, the accumulator chamber 120 comprises a cavity with an air inlet 132 and an air outlet 136 with a spring loaded piston (not shown) located therein. The spring loaded piston is connected to the linear guide 134, which may be present in the form of an elongated metal rod, converting any translational movement of the piston into a linear upward—or downward movement in the direction of the arrows shown in FIG. 1A. In this specific embodiment, the accumulator chamber 120 is divided in two parts, i.e. a chamber to the left and to the right of the barrel 112. However, it would be equally possible to only have one accumulator chamber 120 with only one linear guide 134. We will limit ourselves to describing the part of the accumulator chamber 120 whose inside is visible in FIG. 1A, i.e. the right-hand side knowing well that the description is equally valid for both sides of the accumulator chamber 120. The extruder screw 110 is mechanically connected to the linear guide 134 which is movable in the direction of the arrows depicted inside the linear guide 134. Moreover, a differential pressure regulator 130 is connected to the accumulator chamber 120 and to an air inlet 132 and an air outlet 136 through which air is able to enter and leave the accumulator chamber 120. By controlling the difference in air pressure using the pressure regulator 130, i.e. the amount of air injected into the accumulator chamber through the air inlet 132 and the amount of air leaving the accumulator chamber 120 through the air outlet 136 the piston inside the accumulator chamber 120, which is connected to the extruder screw 110 via the linear guide 134, is able to displace the extruder screw 110 in and out of the barrel 112 in the direction of its central axis A-A.

It should be mentioned here that for the concept to work, any fluid can be used in the accumulator chamber 120 and be regulated by the pressure regulator 130 controlling the difference between the fluid entering the accumulator chamber 120 through the inlet 132 and leaving it through the outlet 136. The fluids may be other gases, liquids and also other flowable substances, such as oil.

Due to the rotational motion of the extruder screw 110 the ground raw material in the barrel 112 will swell and exit the barrel 112 under pressure, whereupon it will enter the conduits 152 and 154 as mentioned earlier. Here it may be mentioned that the conduits 152, 154 may be made of any material able to withstand heat and high liquid pressures. In one example, the conduits 152, 154 may be made of steel or other heat and pressure-resistant metal. In order to keep an even temperature for the melted raw material in the conduits 152, 154, they may be equipped with heating means (not shown).

Now, one may control the liquid pressure in the barrel 112 either by varying the rotational speed of the extruder screw 110 which can be done by a first drive unit 170, such as a servo motor and/or by controlling the translational movement of the extruder screw 110 by the pressure regulator 130 which functions as a second drive unit for the extruder screw 110.

Once the molten raw material is to be injected into the mould, the injection needles 168, 169 are retracted letting the pressurized liquid raw material leave the ejection outlets 182, 184 and enter into the mould. Usually, the injection process is very fast, so that the injection needles 168, 169 will open the ejection outlets for a fraction of a second, before they are closed again.

In the embodiment in FIG. 1A, a pressure sensor 131 is arranged in the barrel 112 and connected to the pressure regulator 130. Using the signals from the pressure sensor 131 the pressure regulator may determine whether it should adjust the differential pressure (the pressure difference between the inlet 132 and outlet 136) in the accumulator chamber 120. The sampling interval for the pressure sensor 131 may be chosen, such that rapid pressure changes don't affect the pressure regulator 130, or the pressure sensor 131 itself may be of the integrating type, thus averaging out rapid pressure changes. The reason for this is that usually the opening and closing of the injection needles 168, 169 is occurring during such short time intervals that regulating such rapid changes would be inefficient and possibly introduce undesired oscillations in the system.

In other embodiments, the pressure sensor 131 may be arranged either in the distribution hub 160 or elsewhere in the system, where large pressure variations can be readily detected.

The pressure regulator 130 may be set up in such a way, that by default it does not adjust the differential pressure over the air inlets and outlets 132, 136 when the system is in injection moulding mode, i.e. continuously ejecting molten raw material into the mould.

However, if the moulding assembly 100 is in stop operation mode, the injection needles 168, 169 will be closed either because there has been an incident at the outlet of the moulding assembly 100 where the injection-moulded products exit the apparatus or, because of problems at the inlet side of the moulding assembly. Another possibility is that the system is not in stop operation mode, i.e. no failures detected either at the input or output end of the moulding assembly, but a list of conditions for the injection needles to open is not fulfilled. Even in this case, the injection needles 168, 169 will remain closed.

Whatever the reason, the extruder screw 110 will at first not be stopped and its rotation speed will remain the same as it was before the moulding assembly 100 has been ordered to stop the ejection of molten raw material into the one or more moulds. However, since there will be a pressure build-up in the barrel 112 and in the conduits 152, 154 due to the swelling of the molten mass of raw material, this pressure increase needs to be dealt with in the moulding assembly. The pressure build-up will be registered by the pressure sensor 131 and the pressure regulator 130 may either instruct the extruder screw 110 to move upwards and out of the barrel 110 and/or instruct the servo motor 170 to decrease the rotational speed of the extruder screw 110.

The last measure to be taken by the pressure regulator 130, if the liquid pressure in the barrel 112 continues to rise, is to instruct the servo motor 170 to stop the movement of the extruder screw 110 altogether. However, for the purpose of a quick restart of the moulding assembly, once the stopping event has been resolved, this should be the last resort in order to prevent the system from exploding from excessive liquid pressure.

Figure 1B:
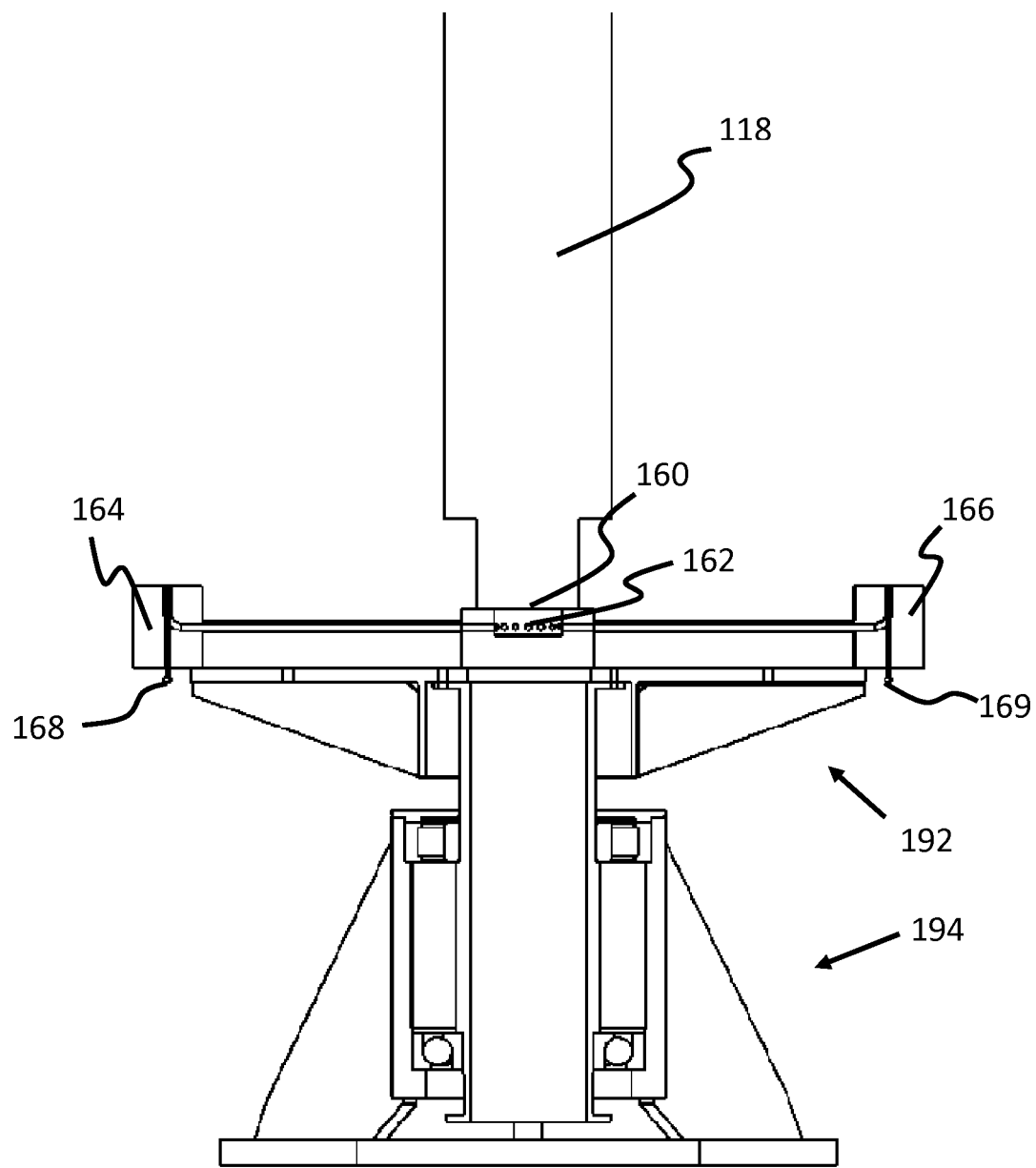
FIG. 1B illustrates the embodiment of the moulding assembly from FIG. 1A where the lower part is shown in more detail.

FIG. 1B illustrates the lower part of the moulding assembly 100 in more detail. As can be seen from the figure, a distribution hub 160 with apertures 162 connected to each corresponding conduit has the task of distributing the pressurized and molten raw material into each respective conduit, of which two are shown in FIG. 1A. As the distribution hub is the object of another patent application, more details will not be given here. Also, the moulding assembly is divided into three parts—a rotating first part shown in FIG. 1A comprising the moulding assembly 100 down to the distribution hub 160, a rotatable second part 192 (which includes the distribution hub 160, the conduits 152, 154 and the hot runners 164, 166) and a static third part 194 which anchors the moulding assembly 100.

One reason for having a rotatable part 192 for the moulding assembly is that it is intended to be part of a rotating carousel in a rotary filling machine, where the injection moulding needs to be performed much faster than in an indexed-type filling machine. The moulding assembly 100 thus is intended to have all its parts rotatable around a central axis, which may be the same as the symmetry axis A-A for the barrel 112 with the exception of the anchoring part 194 which is to remain fixed. The moulding assembly 100 is also intended to be rotatable with the same speed as the rotary filling machine.

Moreover, FIG. 1B illustrates that each injection needle 168, 169 and injection outlet is located within a hot runner 164, 166 which is basically an assembly of heating components arranged to keep the temperature of the molten raw material in it even, before the molten raw material is injected into the mould.

Figure 1C:
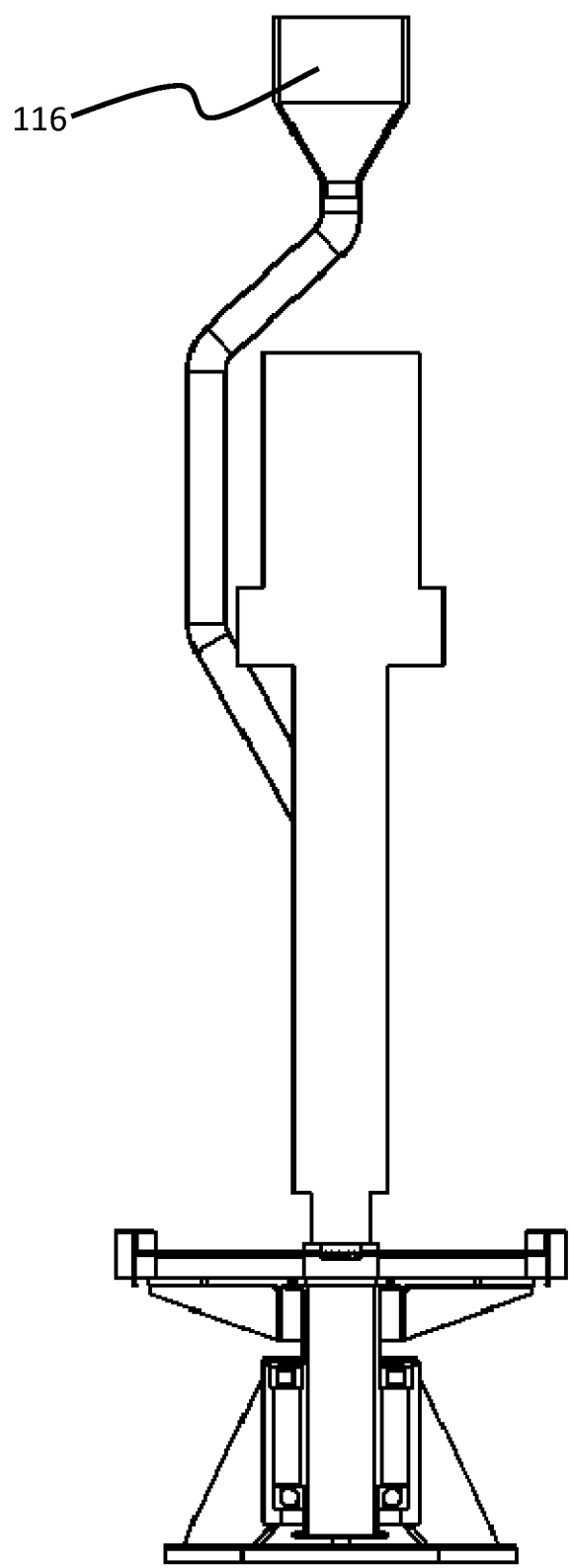
FIG. 1C illustrates more detail in the embodiment from FIG. 1A with respect to the feeding of raw material.

FIG. 1C displays a feeding tube 116 through which raw material in the form of granules is fed and which arrives in the barrel 112 through the raw material inlet 117 as described earlier.

Figure 2:
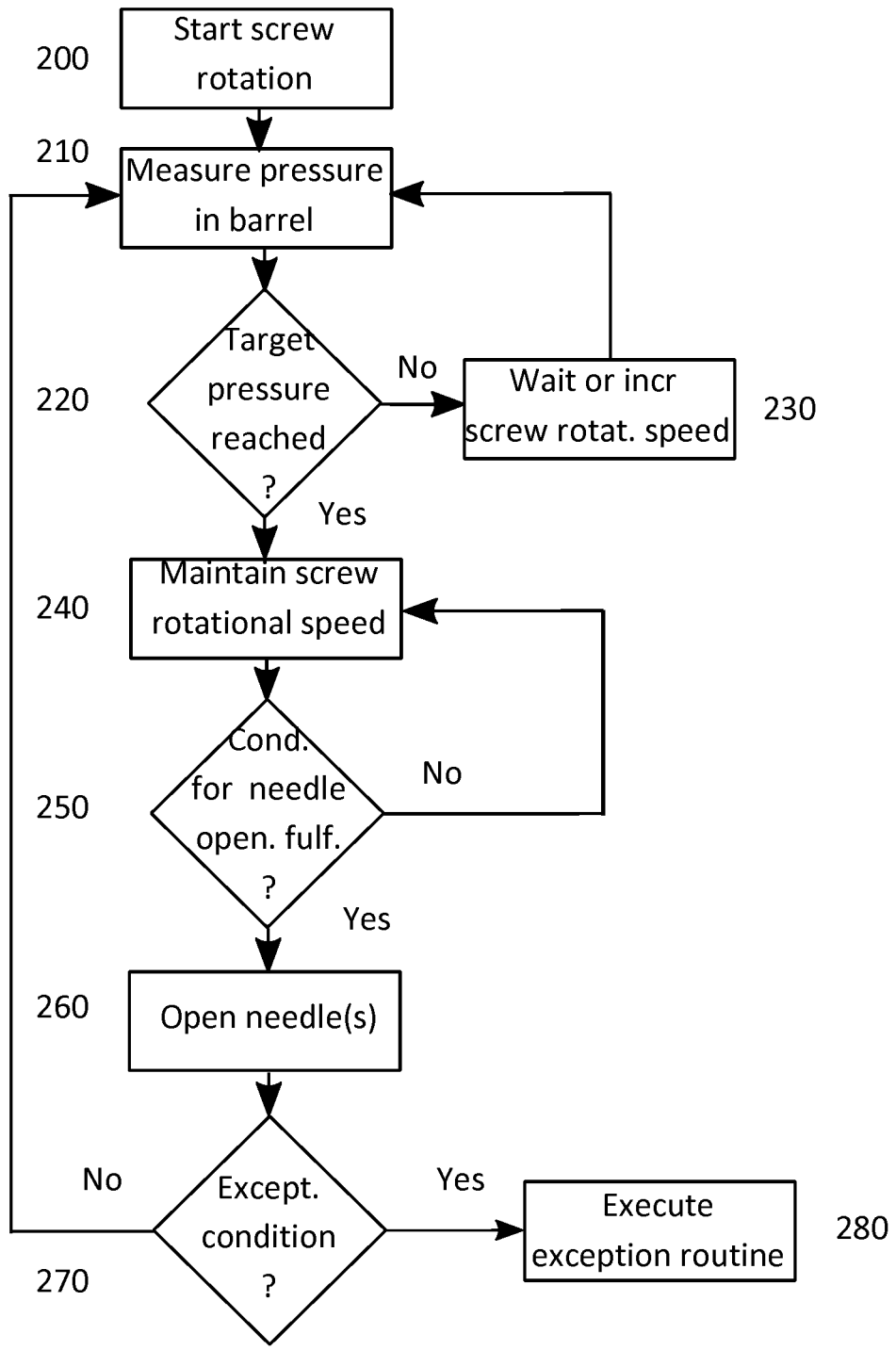
FIG. 2 displays a flow chart with a start-up sequence for the moulding assembly according to one embodiment of the present invention.

FIG. 2 displays a flow chart with a start-up sequence for the moulding assembly according to one embodiment of the present invention. We assume here that at start-up, the extruder screw, such as the extruder screw 110 in the moulding assembly 100 in FIG. 1A is still, i.e. not rotating, and that injection needles, such as the injections needles 168, 169 from FIG. 1A are in the closed position. We also assume that the moulding assembly itself is still, i.e. not rotating.

Now, at step 200 an extruder screw in the moulding assembly, such as the extruder screw 110 starts turning. As stated earlier, the turning is initiated by a drive unit driving the extruder screw, such as the drive unit 170. At the same time, the rotation of the extruder screw has the effect that raw material in the form of plastic granules present at the raw material inlet is drawn into the barrel of the moulding assembly, such as the barrel 112 from FIG. 1A It may be possible that the steps of extruder screw rotation and the receiving of raw material through the inlet do not happen at the same time, i.e. the extruder screw starts rotating and the raw material is fed through the inlet later.

As stated earlier in the text, while the below method describes injection moulding of plastic from plastic granules, the raw material for injection moulding could also be glass or metal, ceramic or any other raw material that can be ground into melted form in the presence of heat.

Now, while the rotational movement of the extruder screw grinds the raw material into liquid form the transition of the raw material from solid into liquid phase is further facilitated by a heating means arranged around the barrel 110. The ground and liquid raw material will exit the barrel 110 and enter into one or more conduits, such as the conduits 152, 154 illustrated in FIG. 1A. Due to the raw material build-up in the barrel and the pressure on the ground raw material from the screw rotation, the liquid raw material will exert a liquid pressure on the walls of the barrel and on the walls of the one or more conduits. A pressure sensor, such as the pressure sensor 131 from FIG. 1A, may be arranged in the barrel in order to measure the liquid pressure therein.

Based on the pressure values received from the pressure sensor at step 210, a pressure regulator, such as the pressure regulator 130, which is arranged to receive the pressure values from the pressure sensor, may at step 220 determine whether the liquid pressure in the barrel has reached a target pressure value. The target liquid pressure value in the barrel may for example be 240 bar.

In case the target pressure value has not been reached, the pressure regulator may be pre-programmed to wait a certain amount of time after start-up at step 230 before performing any pressure regulation function. The reason for that is that in the beginning of the start-up process the barrel will contain relatively little of the molten raw material and thus no significant pressure-build up will be registered by the pressure sensor. Once the barrel is filled entirely by the molten raw material the pressure sensor will register a more significant pressure increase in the barrel. If that is the case and the pressure regulator at step 220 detects that the target pressure still has not been reach, it may at step 230 instruct the drive unit to increase the rotational speed of the extruder screw. This will lead to an increase of the liquid pressure in the barrel. The increase of the rotation speed of the extruder screw may be instructed in several iterations until the pressure regulator has received a liquid pressure value from the pressure sensor that the target liquid pressure in the barrel has been reached.

In that case, the first drive unit will maintain the rotational speed of the extruder screw at step 240, while a control system controlling the opening and closing of injection needles in the moulding assembly will at step 250 wait for a signal indicative that all conditions for opening of the injections needle or needles have been fulfilled. These conditions may be among others that the target liquid pressure in the barrel has been reached, that the one or more moulds for injection moulding are closed and that no stop signals have been received.

If not all conditions for opening of injection needles are fulfilled at step 240, no change in the moulding assembly will happen, i.e. the first drive unit will maintain the rotation speed of the extruder screw and the injection needle or needles will remain closed. However, if the control system controlling the opening and closing of the injection needles has received a signal that all conditions for opening of the injection needles have been fulfilled, the control system instructs the injection needles at step 260 to open and the normal injection moulding process starts.

At step 270 the moulding assembly is in normal operation, but is monitoring if any signal indicating an exception condition has been received either at the control system for the injection needles or the pressure regulator. One possibility is that suddenly the conditions for opening the injection needles are no longer fulfilled and the injection needles need to be closed. Another possibility is that some problem has occurred either at the input or the output side of the moulding assembly, making a stop of the injection moulding process necessary If that is the case, the moulding assembly is set at step 280 into exception mode and the method steps in FIG. 3 are executed.

Figure 3:
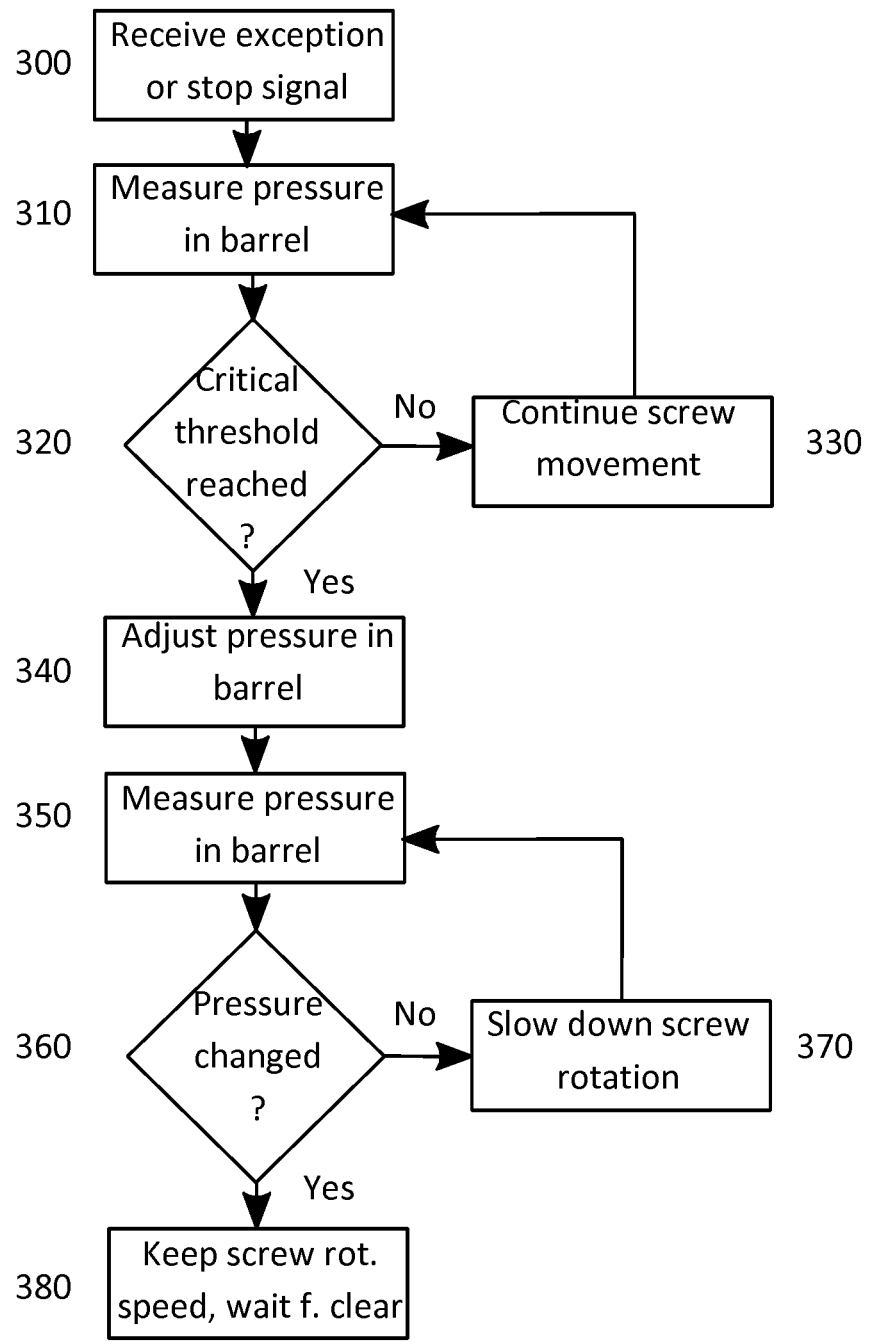
FIG. 3 displays a flow chart depicting the steps taken when the system is in "exception mode".

FIG. 3 thus illustrates how the moulding assembly behaves in exception mode.

At step 300 the moulding assembly has receives a stop signal. The control unit controlling the opening and closing of the injection needles will instruct them to close and to remain closed as long as the exception condition remains. At the same time, the drive unit will continue driving the screw at the same rotational speed as before the exception condition. However, since the injection needles are closed a liquid pressure build-up in the barrel will occur which will be detected at step 310 by the pressure sensor located in the barrel.

In case the liquid pressure has not reached the predefined critical threshold value at step 320, the pressure regulator will not affect any change of pressure difference in the accumulator chamber nor instruct the first drive unit (servomotor 170 in FIG. 1A) to slow down the movement of the extruder screw at step 240. Thus the rotational speed of the extruder screw will be maintained at step 320. One reason for this course of action is that once the exception condition has been cleared, the moulding assembly may quickly proceed with normal injection moulding without any noticeable delay.

However, if the pressure sensor detects at step 320 that the critical threshold value for the pressure in the barrel has been reached, the pressure regulator will attempt at step 340 to adjust the pressure below the critical threshold value by firstly adjusting the pressure difference in the accumulator chamber of the moulding assembly, such as the accumulator chamber 120 in FIG. 1A, so that more fluid will exit the outlet than entering through the inlet of the accumulator chamber. This will have the effect that a piston inside the accumulator chamber and thus the linear guide (such as linear guide 134 in FIG. 1A) will move upwards in the direction of the arrows in FIG. 1A. This will have the effect that the extruder screw is moved out of the barrel.

Also, the pressure regulator may be programmed in such a way, that a rapid rise in pressure over several measurement periods at the pressure sensor may be compensated by the pressure regulator a time instant t before the threshold value for the pressure in the barrel is reached.

Now, at step 350 the pressure in the barrel is measured again to check whether the translational movement of the extruder screw from the barrel has resulted in a pressure decrease or not.

If the liquid pressure in the barrel is still too high at step 360, the pressure regulator instructs at step 370 the first drive unit to slow down the rotational movement of the extruder screw. It may be mentioned that if the slowdown in the extruder screw rotation hasn't affected the liquid pressure in the barrel to decrease below the threshold, the pressure regulator may instruct the first drive unit (such as the servo unit from FIG. 1A) to stop the screw rotation altogether. If, on the other hand, a pressure drop/change is detected at step 360 by the pressure sensor in the barrel, the pressure regulator waits for a clearance signal at step 380, i.e. waits the exception condition to be removed. In that case, the pressure regulator will change the differential pressure in the accumulator chamber, such that the extruder screw moves downwards into the barrel again to its default position. This change is achieved by increasing the amount of fluid entering the accumulator chamber through the fluid inlet compared to amount of fluid leaving the fluid outlet. After step 380, the moulding assembly will return to normal operation and jump back to step 210.

These and other embodiments of the present invention will be more apparent to the skilled person who has studied the above detailed description and the accompanying claims.

The invention claimed is:

1. A moulding assembly comprising:
an inlet configured to receive raw material;
a barrel configured to gather and process the raw material received through the inlet;
a screw configured to engage the raw material in the barrel;
a motor configured to rotate the screw about a first axis extending through the barrel in order to grind the raw material into a liquid material;
a chamber positioned adjacent to the barrel, the chamber comprising a cavity, the cavity including a fluid inlet configured to allow fluid to enter the cavity, a fluid outlet configured to allow fluid to exit the cavity, a piston, and a second axis extending through a center of the cavity, wherein the second axis is spaced from and parallel to the first axis extending through the barrel;
a linear guide configured to move through first and second ends of the cavity along the second axis, wherein the piston is connected to the screw via the linear guide;
a pressure sensor configured to determine a pressure value of the liquid material within the barrel; and
a pressure regulator connected to the fluid inlet, the fluid outlet, and the pressure sensor, the pressure regulator configured to receive the pressure value from the pressure sensor and move the piston in a direction along the second axis by varying at least one of a first amount of fluid entering the cavity through the fluid inlet and a second amount of fluid exiting the cavity through the fluid outlet based upon the pressure value, wherein movement of the piston causes movement of the linear guide along the second axis extending through the cavity and movement of the screw along the first axis extending through the barrel.

2. The moulding assembly of claim 1, wherein the moulding assembly is rotatable around a third axis, the third axis being substantially parallel to the first axis.

3. The moulding assembly of claim 1, further comprising at least one conduit configured to receive the liquid material from the barrel and transport it to an ejection outlet.

4. The moulding assembly of claim 3, wherein the at least one conduit is heated.

5. The moulding assembly of claim 1, further comprising a heating device configured to heat the raw material ground in the barrel.

6. The moulding assembly of claim 1, wherein the motor is a servo motor.

7. The moulding assembly of claim 1, wherein the moulding assembly is configured to connect to a rotatable filling machine and mould at least a part of a packaging container by injection moulding.

8. The moulding assembly of claim 1, further comprising a plurality of conduits for transporting the liquid material from the barrel to a plurality of corresponding ejection outlets, wherein each of the plurality of ejection outlets are configured to supply the liquid material into a mould.

9. The moulding assembly of claim 1, wherein the raw material is one of polymer granulate, metal granulate, silica or similar.

10. The moulding assembly of claim 1, wherein the linear guide comprises an elongated metal rod.

11. The moulding assembly of claim 1, wherein the pressure regulator is configured to move the piston when the received pressure value is equal to or greater than a target pressure value.

12. The moulding assembly of claim 11, wherein the target pressure value is 240 bar.

13. The moulding assembly of claim 11, wherein, when the received pressure value is equal to the target pressure value, the pressure regulator is configured to communicate with the motor to decrease a rotational speed of the screw about the first axis.

14. The moulding assembly of claim 1, wherein the pressure sensor is positioned within the barrel.

15. The moulding assembly of claim 1, wherein the fluid inlet and fluid outlet are configured to allow gas into the cavity of the chamber.

16. The moulding assembly of claim 1, wherein the piston is a spring-loaded piston.

17. A moulding assembly comprising:
a barrel configured to receive raw material through an inlet;
a screw positioned at least partially within the barrel;
a motor configured to rotate the screw about a first axis extending through the barrel in order to grind the raw material into a liquid material;
a chamber comprising a cavity, the cavity including a fluid inlet configured to allow fluid to enter the cavity, a fluid outlet configured to allow fluid to exit the cavity, a piston operably coupled to the screw, and a second axis extending through a center of the cavity, wherein the second axis is spaced from and parallel to the first axis extending through the barrel;
a linear guide configured to move through first and second ends of the cavity along the second axis, wherein the piston is operably coupled to the screw via the linear guide;
a pressure sensor configured to determine a pressure value of the liquid material within the barrel; and
a pressure regulator connected to the fluid inlet, the fluid outlet, and the pressure sensor, wherein the pressure regulator is configured to:
receive the pressure value from the pressure sensor; and
in response to a determination that the pressure value is equal to or greater than a threshold pressure, move the piston by varying at least one of a first amount of fluid entering the cavity through the fluid inlet and a second amount of fluid exiting the cavity through the fluid outlet, wherein movement of the piston causes movement of the linear guide along the second axis extending through the cavity and movement of the screw along the first axis extending through the barrel.

18. The moulding assembly of claim 17, wherein the pressure regulator is further configured to instruct the motor to reduce a rotational speed of the screw about the first axis extending through the barrel in response to the determination that the pressure value is equal to or greater than the threshold pressure.

* * * * *